United States Patent
Pompei (10) Patent No.: US 9,776,212 B2
(45) Date of Patent: *Oct. 3, 2017

(54) ULTRASONIC TRANSDUCER FOR PARAMETRIC ARRAY

(71) Applicant: Frank Joseph Pompei, Wayland, MA (US)

(72) Inventor: Frank Joseph Pompei, Wayland, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,661

(22) Filed: Feb. 17, 2016

(65) Prior Publication Data

US 2016/0158801 A1    Jun. 9, 2016

Related U.S. Application Data

(60) Continuation of application No. 13/925,001, filed on Jun. 24, 2013, now abandoned, which is a continuation of application No. 12/696,630, filed on Jan. 29, 2010, now Pat. No. 8,472,651, which is a continuation of application No. 10/902,901, filed on (Continued)

(51) Int. Cl.

| | |
|---|---|
| *H04R 25/00* | (2006.01) |
| *B06B 1/06* | (2006.01) |
| *B06B 1/02* | (2006.01) |
| *B82Y 10/00* | (2011.01) |
| *B82Y 30/00* | (2011.01) |

(52) U.S. Cl.
CPC .......... *B06B 1/0622* (2013.01); *B06B 1/0292* (2013.01); *B82Y 10/00* (2013.01); *B82Y 30/00* (2013.01)

(58) Field of Classification Search
CPC ... B06B 1/0622; B06B 1/02929; B82Y 10/00; B82Y 30/00
USPC .......................................... 381/191
See application file for complete search history.

(56) References Cited

U.S. PATENT DOCUMENTS

| | | | | |
|---|---|---|---|---|
| 4,283,649 A | * | 8/1981 | Heinouchi | B06B 1/0603 310/322 |
| 4,736,129 A | * | 4/1988 | Endo | H02N 2/007 310/323.09 |

(Continued)

*Primary Examiner* — Davetta W Goins
*Assistant Examiner* — Phylesha Dabney
(74) *Attorney, Agent, or Firm* — BainwoodHuang (57) ABSTRACT

An ultrasonic transducer having a reduced cost of manufacture. The ultrasonic transducer includes a first insulative retaining layer, a second insulative retaining layer, and a vibrator film layer sandwiched between the first and second retaining layers. The first retaining layer includes a first plurality of apertures formed therethrough, and the second retaining layer includes a second plurality of apertures formed therethrough, in which the second apertures are substantially in registration with the first apertures. The ultrasonic transducer further includes a first cover portion having a plurality of spring/backplate assemblies connected thereto, and a second cover portion. The combination of the first retaining layer, the vibrator film layer, and the second retaining layer is sandwiched between the first and second cover portions of the ultrasonic transducer. The laminated construction of the ultrasonic transducer allows the formation of an array of ultrasonic film transducers using a single piece of ultrasonic vibrator film.

19 Claims, 4 Drawing Sheets

Related U.S. Application Data

Jul. 30, 2004, now Pat. No. 7,657,044, which is a division of application No. 10/268,004, filed on Oct. 9, 2002, now Pat. No. 6,771,785.

(60) Provisional application No. 60/328,516, filed on Oct. 9, 2001.

(56) References Cited

U.S. PATENT DOCUMENTS

| | | | |
|---|---|---|---|
| 6,771,785 B2 * | 8/2004 | Pompei | B06B 1/0292 |
| | | | 381/116 |
| 7,657,044 B2 * | 2/2010 | Pompei | B06B 1/0292 |
| | | | 310/328 |
| 8,369,546 B2 * | 2/2013 | Pompei | B06B 1/0292 |
| | | | 310/328 |
| 8,472,651 B2 * | 6/2013 | Pompei | B06B 1/0292 |
| | | | 310/328 |

* cited by examiner

ULTRASONIC TRANSDUCER FOR PARAMETRIC ARRAY

CROSS-REFERENCE TO RELATED APPLICATIONS

This application is a continuation of U.S. patent application Ser. No. 13/925,001 filed Jun. 24, 2013, which is a continuation of U.S. patent application Ser. No. 12/696,630 filed Jan. 29, 2010 now U.S. Pat. No. 8,472,651, which is a continuation of U.S. patent application Ser. No. 10/902,901 filed Jul. 30, 2004 now U.S. Pat. No. 7,657,044, which is a divisional of U.S. patent application Ser. No. 10/268,004 filed Oct. 9, 2002 now U.S. Pat. No. 6,771,785. This application claims benefit of the priority of U.S. Provisional Patent Application No. 60/328,516 filed Oct. 9, 2001.

TECHNICAL FIELD

The present invention relates generally to acoustic transducers, and more specifically to a high performance ultrasonic transducer having a reduced cost of manufacture.

BACKGROUND

Ultrasonic transducers are known that may be employed in parametric speaker systems for generating sonic or ultrasonic signals in nonlinear transmission media. For example, an array of ultrasonic transducers may be employed in a parametric speaker system for generating sonic (i.e., audio) signals in air or water. A conventional parametric audio system typically includes a modulator configured to modulate an ultrasonic carrier signal with at least one audio signal, at least one driver amplifier configured to amplify the modulated carrier signal, and an ultrasonic transducer array comprising a plurality of ultrasonic transducers configured to direct the modulated and amplified carrier signal through the air along a selected path of projection. For example, the ultrasonic transducer array may comprise a plurality of self-contained electrostatic transducers, piezoelectric transducers, electrostrictive transducers, electro-thermo-mechanical film (ETMF) transducers, or polyvinylidene fluoride (PVDF) film transducers. Because of the nonlinear transmission characteristics of the air, the projected ultrasonic signal is demodulated as it passes through the air, thereby regenerating the audio signal along at least a portion of the selected projection path.

In the conventional parametric audio system, the level of audible sound produced by the system is generally proportional to the total surface area of the ultrasonic transducer array, and the coverage area of the sound generated by the array. However, this can be problematic because a typical ultrasonic transducer, such as the typical piezoelectric transducer, has a diameter of only about ¼ inch. As a result, it is often necessary to include hundreds or even one thousand or more piezoelectric or electrostatic transducers in the ultrasonic transducer array to achieve an optimal transducer array surface area.

Although the ultrasonic transducer might be made larger to achieve higher levels of audible sound, this can also be problematic. For example, an electrostatic transducer typically includes a backplate member that is supported by a vibrator film. However, as the electrostatic transducer increases in size, the size of the backplate also increases, thereby potentially damaging the thin vibrator film supporting the larger backplate. Moreover, each of these small transducers is individually connected within the ultrasonic transducer array and typically configured to be stand-alone operable, which can significantly increase both the complexity and the cost of manufacture of the parametric audio system.

It would therefore be desirable to have an improved ultrasonic transducer that can be employed in a parametric speaker system. Such an ultrasonic transducer would provide a highly reliable and reduced cost solution to implementing an ultrasonic transducer array within the parametric speaker system.

SUMMARY

In accordance with the present invention, an ultrasonic transducer is provided that may be employed to implement a highly reliable ultrasonic transducer array in a parametric speaker system, while reducing the cost of manufacture of the overall system. The presently disclosed ultrasonic transducer has a laminated construction that enables the formation of multiple ultrasonic transducers in the ultrasonic transducer array using a single layer of ultrasonic vibrator film, and a single matrix transducer housing.

In one embodiment, the ultrasonic transducer comprises a first insulative retaining layer, a second insulative retaining layer, and a vibrator film layer sandwiched between the first and second retaining layers. The first retaining layer includes a first plurality of apertures formed therethrough, and the second retaining layer includes a second plurality of apertures formed therethrough, in which the second plurality of apertures is substantially in registration with the first plurality of apertures. The ultrasonic transducer further comprises a first cover portion, and a second cover portion. The combination of the first retaining layer, the vibrator film layer, and the second retaining layer is sandwiched between the first and second cover portions.

In the presently disclosed embodiment, the side of the vibrator film layer facing the first retaining layer is unmetallized, and the opposite side of the vibrator film layer facing the second retaining layer is metallized. The ultrasonic transducer further includes a plurality of electrically conductive backplates and a plurality of electrically conductive springs, which are disposed between the first cover and the vibrator film layer in substantially the same plane as the first retaining layer. Each backplate is substantially in registration with a respective aperture formed through the first retaining layer, and the backplate has a shape conforming to the shape of the respective aperture. Each spring is disposed between a respective backplate and the first cover such that the spring is both mechanically and electrically connected to the respective backplate and the first cover, which has an electrically conductive surface. The first cover portion, the spring, the respective backplate, and the combination of the first retaining layer, the vibrator film layer, and the second retaining layer, are configured to cause the spring to urge the backplate against the unmetallized side of the vibrator film layer through the respective aperture.

The combination of the electrically conductive first cover, the plurality of springs, and the plurality of backplates forms a first electrode, and the metallized side of the vibrator film layer forms a second electrode. The ultrasonic transducer is configured to allow a voltage to be applied between the first and second electrodes, thereby generating an electric field between the vibrator film layer and the backplates that causes the film to be attracted to the backplates. In the event the voltage applied between the first and second electrodes is AC, the film vibrates to generate compression waves at sonic or ultrasonic frequencies corresponding to the incoming signal waveform.

In the preferred embodiment, the second cover portion includes a protective mesh layer and an ornamental cover layer, such that the protective layer is sandwiched between the second retaining layer and the ornamental layer. Further, the second retaining layer preferably has a thickness sufficient to create a spacing between the vibrator film layer and the protective and ornamental layers that reduces or effectively eliminates wave attenuation and/or absorption losses otherwise caused by the protective and ornamental layers, respectively, over a sonic or ultrasonic bandwidth of interest.

By providing an ultrasonic transducer in the above-described laminated construction that includes the single layer of ultrasonic vibrator film, an ultrasonic transducer array suitable for use in a parametric speaker system can be manufactured at a reduced cost.

Other features, functions, and aspects of the invention will be evident from the Detailed Description of the Invention that follows.

BRIEF DESCRIPTION OF THE DRAWINGS

The invention will be more fully understood with reference to the following Detailed Description of the Invention in conjunction with the drawings of which.

DETAILED DESCRIPTION

The disclosures of U.S. patent application Ser. No. 13/925,001 filed Jun. 24, 2013, U.S. patent application Ser. No. 12/696,630 filed Jan. 29, 2010 now U.S. Pat. No. 8,472,651, U.S. patent application Ser. No. 10/902,901 filed Jul. 30, 2004 now U.S. Pat. No. 7,657,044, U.S. patent application Ser. No. 10/268,004 filed Oct. 9, 2002 now U.S. Pat. No. 6,771,785, and U.S. Provisional Patent Application No. 60/328,516 filed Oct. 9, 2001, are hereby incorporated herein by reference in their entirety.

A high performance, highly reliable ultrasonic transducer is disclosed that has a reduced cost of manufacture. The presently disclosed ultrasonic transducer has a laminated construction that allows the formation of multiple ultrasonic film transducers using a single layer of ultrasonic vibrator film and a substantially singular mechanical structure.

Figure 1:
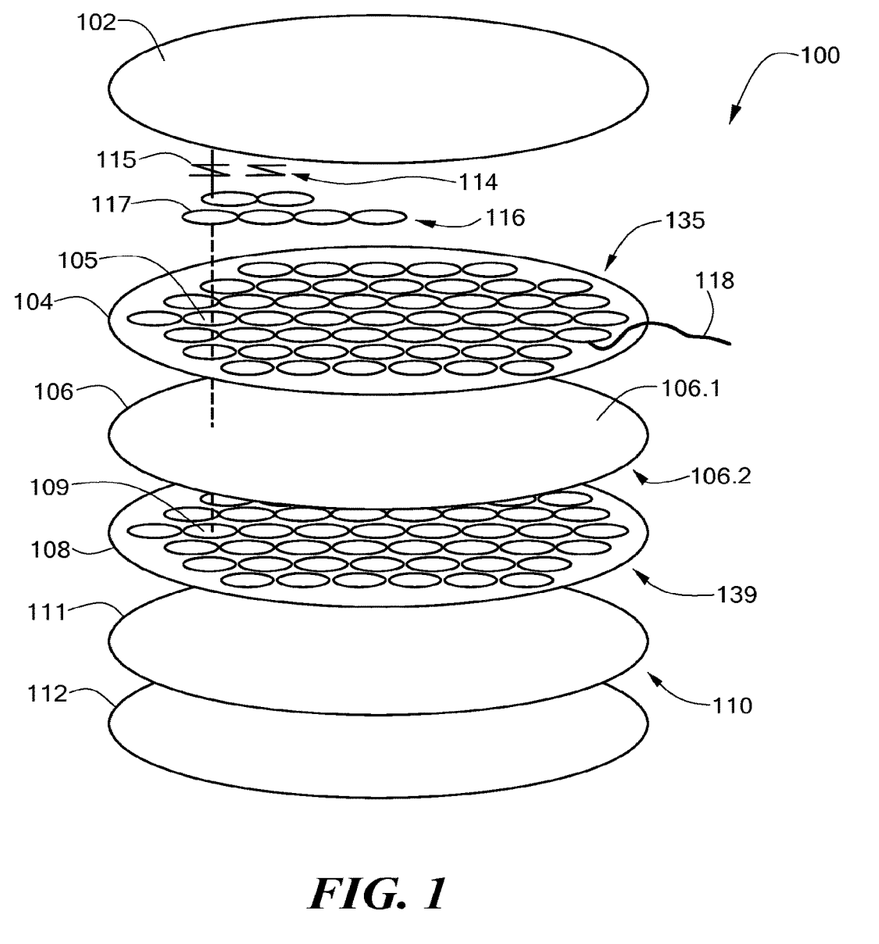
FIG. 1 is a perspective exploded view of an ultrasonic transducer according to the present invention.

FIG. 1 depicts an illustrative embodiment of an ultrasonic transducer 100, in accordance with the present invention. In the illustrated embodiment, the ultrasonic transducer 100 comprises a first cover portion 102, a first insulative retaining layer 104, a vibrator film layer 106, a second insulative retaining layer 108, and a second cover portion 110. As shown in FIG. 1, the vibrator film layer 106 is sandwiched between the first and second retaining layers 104 and 108. Further, the combination of the first retaining layer 104, the vibrator film layer 106, and the second retaining layer 108 is sandwiched between the first and second cover portions 102 and 110.

Specifically, the vibrator film layer 106 includes a first unmetallized (insulating) side 106.1, and an opposite side 106.2 having a metallic or conductive coating. For example, the vibrator film layer 106 may be made of a thin film (having a thickness ranging from 0.2-100.0 .mu.m, typically 8 .mu.m) of polyester, polyimide, polyvinylidene fluoride (PVDF), polyethylene terephthalate (PET), polytetrafluoroethylene (PTFE), or any other suitable polymeric or non-polymeric material; and, the metallic or conductive coating may comprise, e.g., aluminum, gold, or nickel. Further, the second cover portion 110 includes a protective layer 111 and an ornamental layer 112. For example, the protective layer 111 may comprise a cloth made of wire, a perforated sheet made of metal, or a layer made of any other material (preferably electrically conductive) suitable for protecting the vibrator film layer 106 from damage, while allowing sonic or ultrasonic compression waves to pass therethrough with minimal attenuation. The ornamental layer 112 may comprise a cover made of cloth, or any other material suitable for adorning the ultrasonic transducer 100. It is understood that the second cover portion 110 is optional and may be omitted.

Moreover, the first retaining layer 104 includes a first plurality of apertures 135 such as an aperture 105 formed therethrough, and the second retaining layer 108 includes a second plurality of apertures 139 such as an aperture 109 formed therethrough. The first plurality of apertures 135 is substantially in registration with the second plurality of apertures 139. For example, each of the apertures 135 and 139 may be circular, square, rectangular, hexagonal, or any other suitable geometric shape, and may have a diameter of about ½ inch to 4 inches.

The ultrasonic transducer 100 further includes a plurality of electrically conductive backplates 116 such as a backplate 117, and a corresponding plurality of electrically conductive springs 114 such as a spring 115, which are disposed between the first cover 102 and the vibrator film layer 106 in substantially the same plane as the first retaining layer 104. In the presently disclosed embodiment, a respective backplate, and at least one respective spring, are provided for each of the apertures 135 formed in the first retaining layer 104. It is understood, however, that a single compound spring may alternatively be employed to hold the plurality of backplates 116. Each of the plurality of backplates 116 is relatively lightweight, and has a shape substantially conforming to the shape of the apertures 135 and 139. Further, each of the backplates 116 is substantially in registration with a respective one of the apertures 135 formed through the first retaining layer 104. Moreover, each of the plurality of springs 114 is disposed between a respective backplate and the first cover 102, such that the spring 114 is both mechanically and electrically connected to the respective backplate and the first cover 102. The first cover portion 102, the springs 114, the backplates 116, and the combination of the first retaining layer 104, the vibrator film layer 106, and the second retaining layer 108, are configured to cause the resilient springs 114 to urge the backplates 116 against the unmetallized side 106.1 of the vibrator film layer 106 through the respective apertures 135.

For example, the backplate 117 is disposed in the aperture 105, which is substantially in registration with the aperture 109. Further, the spring 115 is disposed in the aperture 105 between the backplate 117 and the first cover portion 102. Accordingly, the first cover portion 102, the spring 115, the backplate 117, and the combination of the first retaining layer 104, the vibrator film layer 106, and the second retaining layer 108, are configured to cause the spring 115 to urge the backplate 117 against the vibrator film layer 106 through the aperture 105.

In the preferred embodiment, the vibrator film layer 106 is laminated between the first and second insulative retaining layers 104 and 108. Specifically, the vibrator film layer 106 and the first and second retaining layers 104 and 108 are united using any suitable mechanical fasteners, rivets, and/or adhesives to form a rigid laminated structure, thereby prohibiting the film layer 106 from inadvertently shifting between the retaining layers 104 and 108. For example, a suitable adhesive may be employed to laminate the first retaining layer 104 and the vibrator film layer 106. Further, the second retaining layer 108 preferably has a plurality of threaded holes (e.g., a hole 230, see FIG. 2) formed therethrough, which are configured to accept respective screws (not shown) extending through corresponding holes (not shown) in the first cover 102 (see FIG. 1) and the first retaining layer 104 for securely fastening the first retaining layer 104, the vibrator film layer 106, and the second retaining layer 108 to the first cover portion 102. It is noted that because the screws may extend through one or more electrically active layers, the screws are preferably insulating fasteners such as nylon screws. The backplates 116 may be made of aluminum, or any other suitable electrically conductive, lightweight material. Further, the sides (not numbered) of the backplates 116 that are urged against the vibrator film layer 106 by the respective springs 114 preferably have pitted, grooved, and/or textured surfaces, which may be configured to tailor the acoustic characteristics (e.g., the bandwidth) of the ultrasonic transducer. Moreover, the springs 114 may comprise coil springs (preferably, conical coil springs), leaf springs, or any other suitable type of spring. The springs 114 are configured to apply a substantially constant force against the vibrator film layer 106 to keep the film layer 106 pressed against the backplates 116, without wrinkling the film. It is believed that this configuration of the springs 114 would compensate for film creep, which may occur in the vibrator film layer 106 after being subjected to the force applied by the springs 114 over an extended period of time.

As described above, the springs 114 are electrically connected to the electrically conductive first cover 102 and the backplates 116. The combination of the first cover 102, the springs 114, and the backplates 116 therefore forms a first electrode of the ultrasonic transducer 100. In the preferred embodiment, this first electrode is at ground potential to provide a degree of electromagnetic shielding in the vicinity of the first cover portion 102 of the ultrasonic transducer 100. The metallized side 106.2 of the vibrator film layer 106 forms a second electrode of the transducer 100.

Accordingly, the ultrasonic transducer 100 is configured to allow a drive voltage to be applied between the first and second electrodes of the transducer to generate an electric field between the vibrator film layer 106 and the backplates 116, thereby causing the film 106 to be attracted to the backplates 116. By applying AC voltages between the first and second electrodes, the film can be made to vibrate for generating one or more sonic or ultrasonic compression waves. For example, the transducer drive signal may be applied to the ultrasonic transducer assembly via a connection cable 118.

In the presently disclosed embodiment, the second cover portion 110 is spaced a predetermined distance from the vibrator film layer 106 by the thickness of the second retaining layer 108. By precisely setting the thickness of the second retaining layer 108, sonic or ultrasonic attenuation caused by the protective layer 111 can be reduced or effectively eliminated over a selected bandwidth of interest. For example, the thickness of the second retaining layer 108 may be set to about one-eighth of an inch to effectively eliminate ultrasonic attenuation over a bandwidth ranging from approximately 45-55 kHz (or preferably 45-70 kHz). It should be appreciated that the wavelength of an ultrasonic compression wave at 55 kHz is about ¼ inch, which is equal to about twice the thickness of the second retaining layer 108 in this illustrative example. It is noted that the optimal thickness of the second retaining layer 108 for achieving an absorption minimum may be determined experimentally. This is because the optimal layer thickness may be dependent upon the acoustical characteristics (e.g., the impedance) of the protective layer 111 and the ornamental layer 112. Although there are generally many minima for absorption, the first absorption minimum is preferred because it keeps the transducer thin, and permits the highest bandwidth of reduced absorption. Accordingly, in the preferred embodiment, the thickness of the second retaining layer 108 is set to place the second cover portion 110 (including the protective layer 111 and the ornamental layer 112) approximately ½ wavelength from the vibrator film layer 106. It is believed that by placing the second cover 110 a distance of about ½ wavelength from the vibrator film layer 106, a standing wave is generated between the vibrator film layer 106 and the protective layer 111, thereby allowing energy to be conserved between the layers 106 and 111 and re-radiated after a reflection.

As further described above, the ultrasonic transducer 100 includes screws (not shown) extending from the grounded first cover portion 102 to the second retaining layer 108 of the ultrasonic transducer assembly. In the preferred embodiment, the screws are electrically insulating, and are configured to extend through the threaded holes (e.g., the hole 230, see FIG. 2) in the second retaining layer 108 to the protective layer 111. Moreover, the protective mesh layer 111 can be connected to ground potential by a spring disposed in an "empty" aperture (i.e., an aperture without film) to provide a degree of electromagnetic shielding in the vicinity of the second cover portion 110 of the ultrasonic transducer 100.

Figure 2:
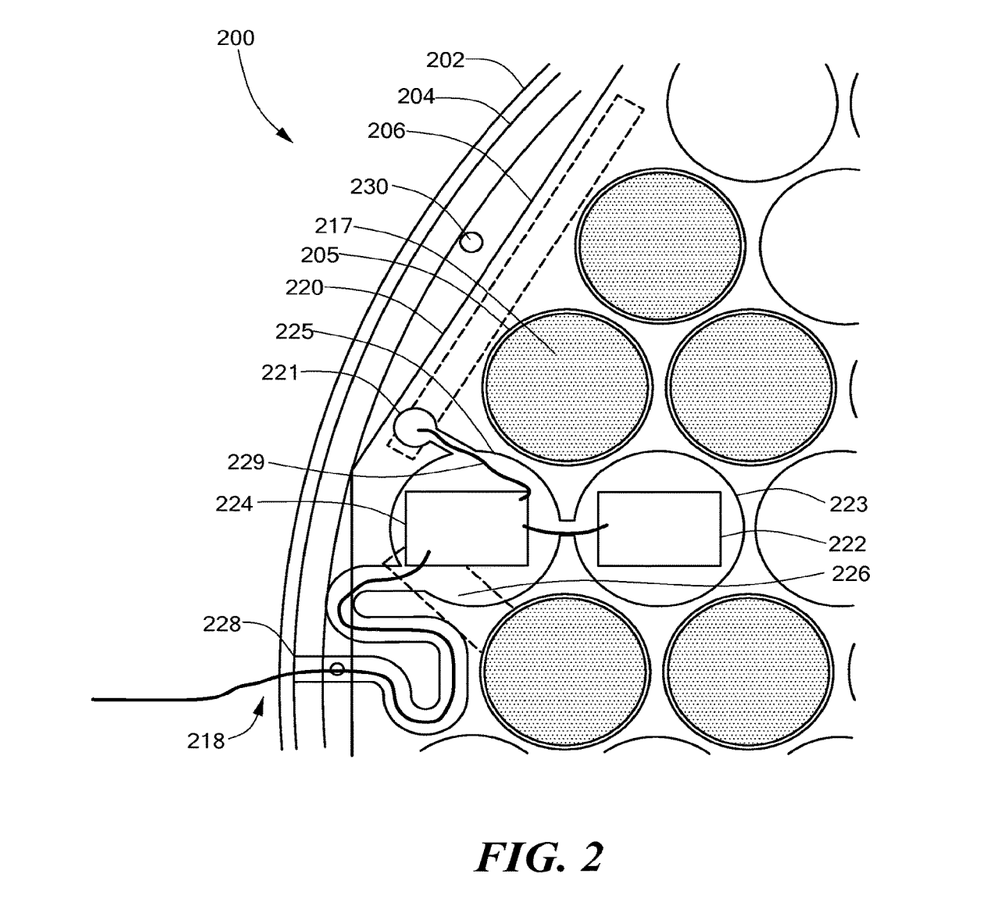
FIG. 2 is a detailed plan view of a portion of the ultrasonic transducer depicted in FIG. 1.

As shown in FIG. 2 depicting a detailed view 200 of the ultrasonic transducer 100 (see FIG. 1), a vibrator film layer 206 is trimmed near the hole(s) 230 to prevent the electrically active film layer 206 from obstructing the hole(s) 230 and inadvertently making electrical contact with the grounded screw(s) (not shown) passing through the hole(s) 230. It is noted that the spacing of about ½ wavelength from the vibrator film layer 106 (see FIG. 1) to the second cover 110 generally constitutes a practical operating distance between the electrically active film layer 106 and the grounded protective layer 111.

In the preferred embodiment, the insulative ornamental layer 112 is applied directly to the protective layer 111 with no spacing therebetween. It is believed that by applying the ornamental layer 112 directly to the protective layer 111, absorption losses caused by the ornamental layer 112 can be reduced or effectively eliminated over the selected bandwidth of interest. For example, the insulative material of the ornamental layer 112 may be secured to the ultrasonic transducer assembly by stretching the material around the protective layer 111, the second retaining layer 108, the vibrator film layer 106, and the first retaining layer 104, and by fastening the material along the periphery of the first retaining layer 104 between the first retaining layer 104 and the first cover portion 102 using a suitable adhesive.

FIG. 2 depicts the detailed view 200 of the ultrasonic transducer 100 (see FIG. 1). As shown in FIG. 2, the ultrasonic transducer 200 comprises a first cover portion 202, a first insulative retaining layer 204 including a plurality of apertures such as an aperture 205 formed therethrough, the vibrator film layer 206, a plurality of backplates such as a backplate 217 substantially in registration with the aperture 205, and a connection cable 218 including respective positive and negative wires.

In the preferred embodiment, the connection cable 218 comprises a coaxial cable to minimize electromagnetic radiation. The connection cable 218 is mounted in a labyrinth channel 228, which is cut into the first retaining layer 204 to provide a degree of strain relief for the cable 218. Further, the negative wire (not shown) of the connection cable 218 is connected to the above-described first electrode of the ultrasonic transducer 200, and the positive wire 229 of the connection cable 218 is connected to the above-described second electrode of the ultrasonic transducer 200.

In the presently disclosed embodiment, the negative wire is connected to the first electrode via a first piece of electrically conductive tape 226 (e.g., copper tape), which may be secured to any convenient part of the backplate/spring assembly. In the preferred embodiment, the first piece of copper tape is tucked between the coils of at least one spring. The positive wire 229 is connected to the second electrode via a second piece of copper tape 220 secured to the inside surface of the second retaining layer 108 (see FIG. 1). It is noted that the positive wire 229 passes through a first opening 221 formed in the vibrator film layer 206 to connect to the second piece of copper tape 220. Further, the copper tape 220 faces the metallized side 106.2 of the vibrator film layer 206 (see FIG. 2) to allow the tape 220 to make good electrical contact with the film in the final ultrasonic transducer assembly. In the preferred embodiment, the copper tape 220 extends at least half way across the vibrator film layer 206 to deliver power evenly to the film. Further, silver paint, conductive epoxy, or any other suitable electrical coupling compound is employed between the copper tape 226 and the backplate, and between the copper tape 220 and the vibrator film layer 206, to improve conductivity. For example, the negative and positive wires of the connection cable 218 may be soldered to the first and second copper tapes 226 and 220, respectively.

The ultrasonic transducer 200 optionally includes a bias circuit 222 and a coupling circuit 224. For example, a DC bias signal may be "piggybacked" onto the AC transducer drive signal carried by the connection cable 218. The coupling circuit 224 is configured to receive the AC drive signal, and to block the DC bias signal from returning through the connection cable 218. The bias circuit 222 is configured to generate a high voltage DC bias signal, which is employed to amplify the ultrasonic transducer output and improve linearity.

In the illustrated embodiment, the bias circuit 222 and the coupling circuit 224 are disposed in second and third openings 223 and 225, respectively, formed in the vibrator film layer 206. Further, the wire (not numbered) connecting the bias circuit 222 and the coupling circuit 224 is disposed in a channel formed in the film to interconnect the openings 223 and 225.

It should be appreciated that the laminated construction of the ultrasonic transducer 100 (see FIG. 1) effectively allows the formation of an array of ultrasonic film transducers, each ultrasonic transducer corresponding to a respective one of the backplates 116. It is further appreciated that the ultrasonic transducer array is formed using a substantially singular piece of ultrasonic vibrator film (e.g., the vibrator film layer 106).

Figure 3:
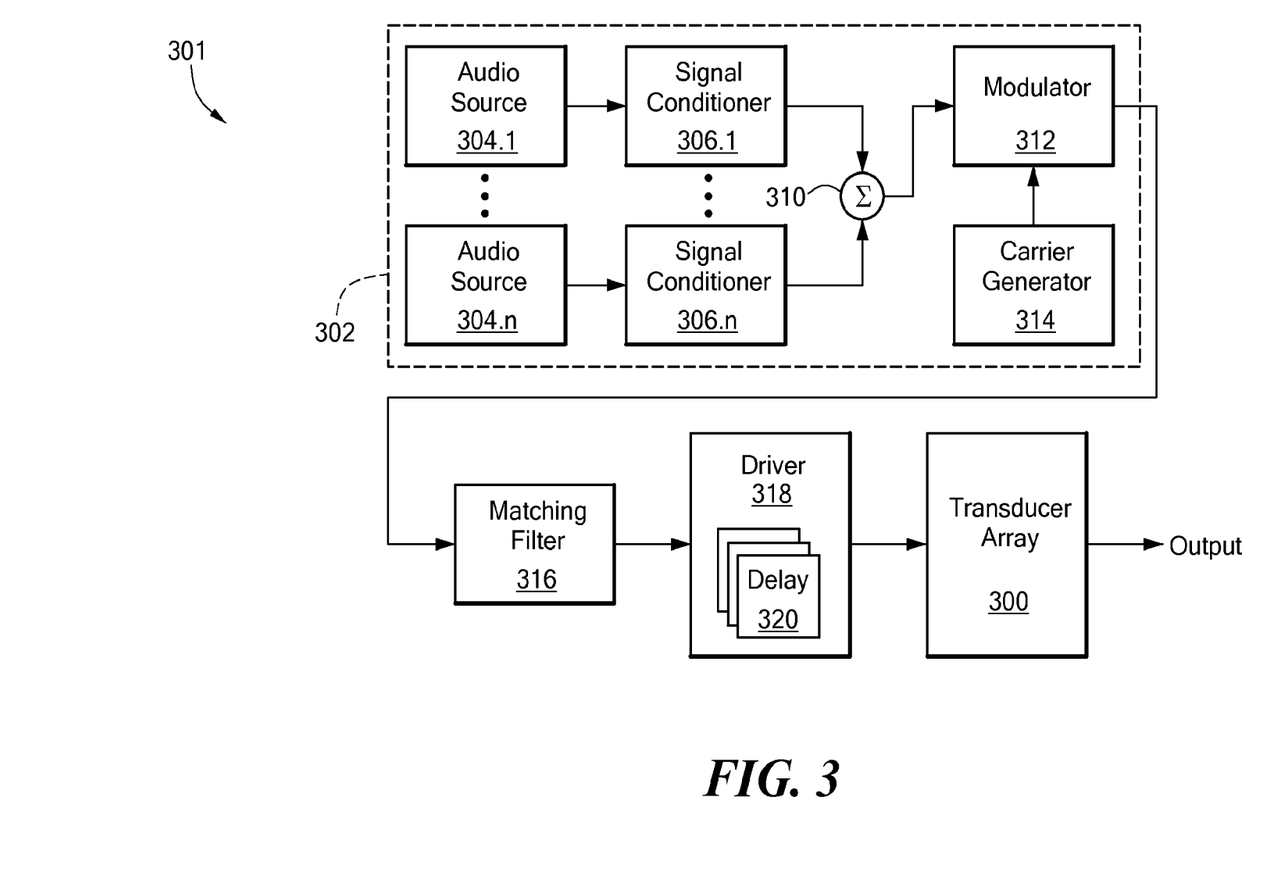
FIG. 3 is a block diagram of a parametric audio system including the ultrasonic transducer of FIG. 1.

FIG. 3 depicts an illustrative embodiment of a parametric audio system 301, which includes an ultrasonic transducer array 300 conforming to the above-described ultrasonic transducer 100 (see FIG. 1). In the illustrated embodiment, the ultrasonic transducer array 300 is driven by a signal generator 302, which includes an ultrasonic carrier signal generator 314 and one or more audio signal sources 304.1-304.n. Optional signal conditioning circuits 306.1-306.n receive respective audio signals generated by the audio signal sources 304.1-304.n, and provide conditioned audio signals to a summer 310. It is noted that such conditioning of the audio signals may alternatively be performed after the audio signals are summed by the summer 310. In either case, the conditioning typically comprises a nonlinear inversion necessary to reduce or effectively eliminate distortion in the reproduced audio. The conditioning may additionally comprise standard audio production routines such as equalization (of audio) and compression.

A modulator 312 receives a composite audio signal from the summer 310 and an ultrasonic carrier signal from the carrier generator 314, and modulates the ultrasonic carrier signal with the composite audio signal. The modulator 312 is preferably adjustable in order to vary the modulation index. Amplitude modulation by multiplication with a carrier is preferred, but because the ultimate goal of such modulation is to convert audio-band signals into ultrasound, any form of modulation that achieves that result may be employed.

In a preferred embodiment, the modulator 312 provides the modulated carrier signal to a matching filter 316, which is configured to compensate for the generally non-flat frequency response of a driver amplifier 318 and the ultrasonic transducer array 300. The matching filter 316 provides the modulated carrier signal to the driver amplifier 318, which in turn provides an amplified version of the modulated carrier signal to the multiple ultrasonic film transducers of the ultrasonic transducer array 300. The driver amplifier 318 may include a plurality of delay circuits 320 that apply relative phase shifts across all frequencies of the modulated carrier signal in order to steer, focus, or shape the ultrasonic beam provided at the output of the ultrasonic transducer array 300. The ultrasonic beam, which comprises the high intensity ultrasonic carrier signal amplitude-modulated with the composite audio signal, is demodulated on passage through the air due to the nonlinear propagation characteristics of the propagation medium to generate audible sound. It is noted that the audible sound generated by way of this nonlinear parametric process is approximately proportional to the square of the modulation envelope.

Accordingly, to reduce distortion in the audible sound, the signal conditioners 306.1-306.n preferably include nonlinear inversion circuitry for inverting the distortion that would otherwise result in the audible signal. For most signals, this inversion approximates taking a square root of the signal, after appropriate offset. Further, to increase the level of the audible sound, the ultrasonic transducer array 300 is preferably configured to maximize the effective surface area of the multiple ultrasonic film transducers.

The frequency of the carrier signal generated by the ultrasonic carrier signal generator 314 is preferably on the order of 45 kHz or higher, and more preferably on the order of 55 kHz or higher. Because the audio signals generated by the audio signal sources 304.1-304.n typically have a maximum frequency of about 20 kHz, the lowest frequency components of substantial intensity according to the strength of the audio signal in the modulated ultrasonic carrier signal have a frequency of about 25-35 kHz or higher. Such frequencies are typically above the audible range of hearing of human beings, and therefore generally have reduced impact on the human auditory system. A parametric audio system conforming to the configuration of the above-described system 301 is disclosed in co-pending U.S. patent application Ser. No. 09/758,606 filed Jan. 11, 2001 entitled PARAMETRIC AUDIO SYSTEM, which is incorporated herein by reference.

Having described the above illustrative embodiment, other alternative embodiments or variations may be made. For example, it was described that the first electrode comprising the first cover portion 102 of the ultrasonic transducer 100 (see FIG. 1) is grounded to provide electromagnetic shielding, and that the second electrode comprising the metallized side 106.2 of the vibrator film layer 106 is electrically active. However, the vibrator film layer may alternatively be grounded, and the first cover portion may be made electrically active. In this alternative embodiment, the vibrator film layer poses minimal shock hazard, and therefore the protective mesh layer may generally be placed as close to the film as desired (or the protective layer may be omitted altogether). It is noted that a shielding layer (not shown) may be added near the electrically active first cover portion to minimize externally radiated electromagnetic fields.

It was further described that the parametric audio system 301 (see FIG. 3) may include the delay circuits 320 configured to apply relative phase shifts to the modulated carrier signal to steer, focus, or shape the ultrasonic beam generated by the ultrasonic transducer. However, such a phased or "shaded" ultrasonic transducer array configuration may alternatively be achieved by suitably attenuating or filtering multiple drive signals or individual array elements, and then sending the attenuated/filtered signals to selected regions of the array. For example, the vibrator film layer may be grounded, and the multiple attenuated/filtered drive signals may be sent to the selected regions of the ultrasonic transducer array via the springs and backplates. Further, a circuit board (not shown) having traces suitable for carrying the multiple drive signals, and for contacting the springs, may be employed in place of the first cover portion of the ultrasonic transducer. Such a circuit board may also include processing circuitry, routing circuitry, and/or other circuitry required to produce the multiple signals driving the phased transducer array.

It was also described that the vibrator film layer 106 (see FIG. 1) may be made of polyester, polyimide, PVDF, PET, PTFE, or any other suitable polymeric or non-polymeric material. However, in the preferred embodiment, the vibrator film layer is made of a suitable material that is resistive, so that the film heats up slightly (e.g., by a few degrees Celsius) during operation of the ultrasonic transducer. This slight heating of the vibrator film layer reduces the effects of condensation on the film. By raising the temperature of the vibrator film layer above the ambient temperature by resistive heating, the dew point is raised, thereby preventing the formation of condensation on the film and allowing reliable transducer output, even in adverse environmental conditions.

It is noted that suitable threaded inserts (not shown) may be used to mount the ultrasonic transducer 100 (see FIG. 1) to an external apparatus. For example, ¼-20 type threaded inserts may be employed to maintain compatibility with common camera mounting equipment (with appropriate metric adjustments for European use). In the event a threaded insert(s) is located near the center of the ultrasonic transducer, electrically active material (such as the vibrator film layer) is generally removed in the proximity of the insert(s) to avoid a short circuit, and to prevent user exposure to high voltages.

Figure 4:
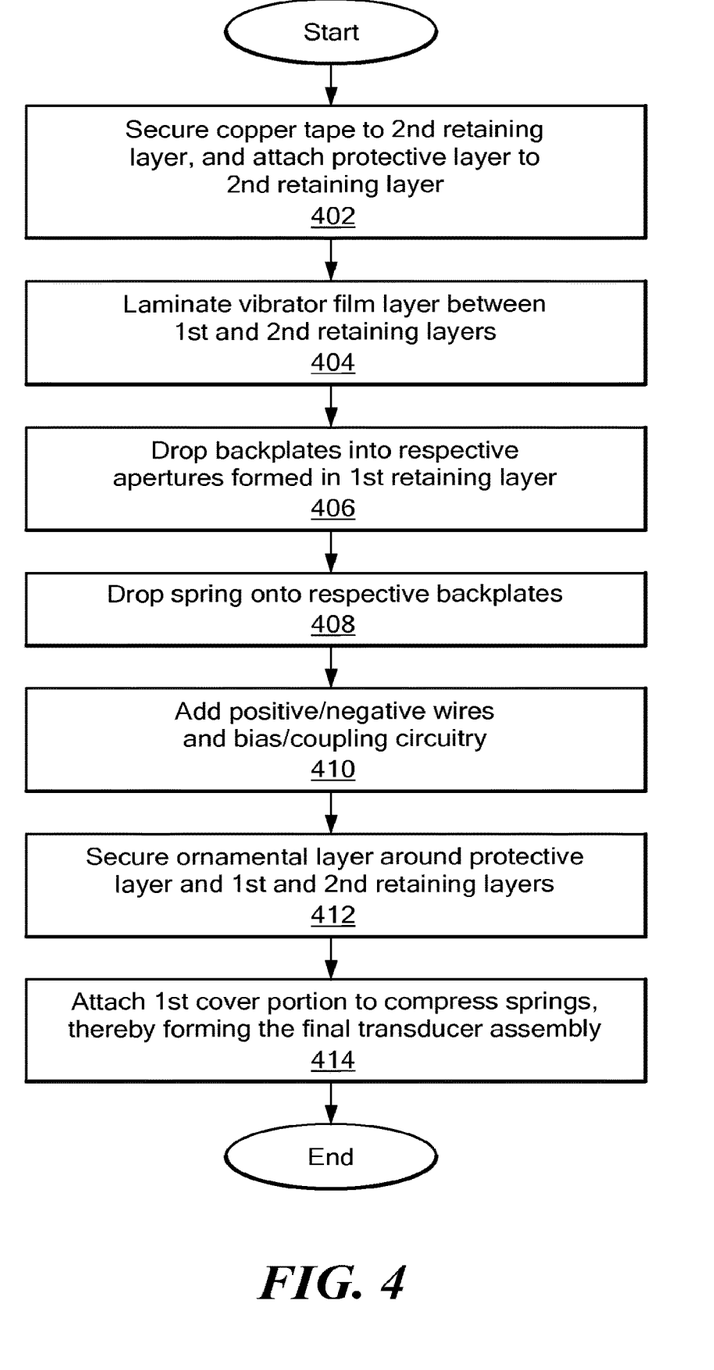
FIG. 4 is a flow diagram illustrating a method of manufacturing the ultrasonic transducer of FIG. 1.

A method of manufacturing an ultrasonic transducer according to the present invention is illustrated by reference to FIG. 4. As depicted in step 402, copper tape is secured to the inside surface of the second insulative retaining layer for connecting the positive wire to the second electrode, and the protective layer is attached to the outside surface of the second insulative retaining layer. Next, the vibrator film layer is laminated, as depicted in step 404, in between the first and second insulative retaining layers. The backplates are then dropped, as depicted in step 406, into the respective apertures formed in the first retaining layer. Next, the springs are dropped, as depicted in step 408, onto the respective backplates. The positive/negative wires and bias/coupling circuitry is then added, as depicted in step 410. Next, the ornamental layer is stretched and secured, as depicted in step 412, substantially around the protective layer and the first and second retaining layers. The first cover portion is then secured in place, as depicted in step 414, to compress the springs, thereby forming the final ultrasonic transducer assembly.

It will further be appreciated by those of ordinary skill in the art that modifications to and variations of the above-described ultrasonic transducer for parametric array may be made without departing from the inventive concepts disclosed herein. Accordingly, the invention should not be viewed as limited except as by the scope and spirit of the appended claims.

What is claimed is:

1. An ultrasonic transducer, comprising:
   a vibrator surface operative to generate one or more ultrasonic compression waves; and
   a protective cover adjacent to one side of the vibrator surface and configured to allow the ultrasonic compression waves to pass therethrough,
   wherein the protective cover and the vibrator surface are spaced apart a predetermined distance, the predetermined distance being equal to a fraction of a wavelength of the ultrasonic compression waves, and
   wherein the fraction of the wavelength of the ultrasonic compression waves corresponds to a transmission loss minimum of the protective cover, whereby absorption and transmission losses associated with the ultrasonic compression waves passing through the protective cover are minimized.

2. The ultrasonic transducer of claim 1 further comprising:
   a spacer element operative to maintain the protective cover and the vibrator surface spaced apart at the predetermined distance.

3. The ultrasonic transducer of claim 1 wherein the protective cover and the vibrator surface are spaced apart by the predetermined distance to minimize absorption and transmission losses for a specified frequency of the ultrasonic transducer.

4. The ultrasonic transducer of claim 3 wherein the protective cover and the vibrator surface are spaced apart by the predetermined distance to minimize absorption and transmission losses for one or more specified frequencies near the specified frequency.

5. The ultrasonic transducer of claim 1 wherein the protective cover includes a protective layer and a fabric layer.

6. The ultrasonic transducer of claim 5 wherein the fabric layer is disposed against the protective layer.

7. The ultrasonic transducer of claim 5 wherein the fabric layer and the protective layer are spaced apart a second predetermined distance sufficient to minimize absorption and transmission losses due to the protective cover.

8. The ultrasonic transducer of claim 5 wherein the fabric layer and the vibrator surface are spaced apart a second predetermined distance sufficient to minimize absorption and transmission losses due to the protective cover.

9. The ultrasonic transducer of claim 1 wherein the protective cover is a layer of fabric.

10. The ultrasonic transducer of claim 1 wherein the predetermined distance is about ½ of the wavelength of the ultrasonic compression waves generated by the vibrator surface.

11. The ultrasonic transducer of claim 1 wherein the predetermined distance to minimize absorption and transmission losses due to the protective cover corresponds to a minimum distance between the protective cover and the vibrator surface for a specified frequency of the ultrasonic compression waves generated by the vibrator surface.

12. The ultrasonic transducer of claim 1 wherein the predetermined distance to minimize absorption and transmission losses due to the protective cover corresponds to a minimum distance between the protective cover and the vibrator surface for a specified wavelength of the ultrasonic compression waves generated by the vibrator surface.

13. The ultrasonic transducer of claim 1 wherein the protective cover is connected to ground potential.

14. A method of generating one or more ultrasonic compression waves, comprising:
providing an ultrasonic transducer having a vibrator surface for generating the ultrasonic compression waves, the ultrasonic transducer including a protective cover adjacent to one side of the vibrator surface for allowing the ultrasonic compression waves to pass therethrough;
spacing the protective cover and the vibrator surface apart a predetermined distance equal to a fraction of a wavelength of the ultrasonic compression waves, the fraction of the wavelength corresponding to a transmission loss minimum of the protective cover; and
generating, by the vibrator surface, the ultrasonic compression waves such that the ultrasonic compression waves pass through the protective cover, whereby absorption and transmission losses associated with the ultrasonic compression waves passing through the protective cover are minimized.

15. The method of claim 14 wherein the spacing of the protective cover and the vibrator surface includes spacing the protective cover and the vibrator surface apart the predetermined distance equal to about ½ of the wavelength of the ultrasonic compression waves generated by the vibrator surface.

16. An ultrasonic transducer, comprising:
a vibrator surface operative to generate one or more ultrasonic compression waves, the vibrator surface having a first side and a second side; and
a protective cover configured to allow the ultrasonic compression waves to pass therethrough, the protective cover being spaced a predetermined distance apart from the first side of the vibrator surface by an airspace, the airspace extending across at least a portion of the first side of the vibrator surface between the vibrator surface and the protective cover,
wherein the predetermined distance across the airspace is equal to a fraction of a wavelength of the ultrasonic compression waves generated by the vibrator surface, the fraction of the wavelength corresponding to a transmission loss minimum of the protective cover,
whereby absorption and transmission losses associated with the ultrasonic compression waves passing through the protective cover are minimized.

17. The ultrasonic transducer of claim 16 wherein the predetermined distance across the airspace is equal to about ½ of the wavelength of the ultrasonic compression waves generated by the vibrator surface.

18. A method of generating one or more ultrasonic compression waves, comprising:
providing an ultrasonic transducer having a vibrator surface and a protective cover, the vibrator surface having a first side and a second side, the protective cover being adjacent to the first side of the vibrator surface for allowing the ultrasonic compression waves to pass therethrough;
spacing the protective cover a predetermined distance apart from the first side of the vibrator surface by an airspace, the airspace extending across at least a portion of the first side of the vibrator surface between the vibrator surface and the protective cover; and
generating the ultrasonic compression waves by the vibrator surface, the predetermined distance across the airspace being equal to a fraction of a wavelength of the ultrasonic compression waves generated by the vibrator surface, the fraction of the wavelength corresponding to a transmission loss minimum of the protective cover, whereby absorption and transmission losses associated with the ultrasonic compression waves passing through the protective cover are minimized.

19. The method of claim 18 wherein the spacing of the protective cover includes spacing the protective cover the predetermined distance apart from the first side of the vibrator surface, the predetermined distance across the airspace being equal to about ½ of the wavelength of the ultrasonic compression waves generated by the vibrator surface.

* * * * *